US010321630B2

(12) United States Patent
Talbot et al.

(10) Patent No.: US 10,321,630 B2
(45) Date of Patent: Jun. 18, 2019

(54) AGRICULTURAL HEADER WITH GROUND ENGAGING GAUGE MEMBERS FOR ABOVE GROUND CUTTING

(71) Applicant: MacDon Industries Ltd., Winnipeg (CA)

(72) Inventors: Francois R. Talbot, Winnipeg (CA); Eric Alain Grenier, Somerset (VA); Karl Bernard Hundt, Lake Mills, WI (US)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 15/661,767

(22) Filed: Jul. 27, 2017

(65) Prior Publication Data

US 2019/0029175 A1    Jan. 31, 2019

(51) Int. Cl.
*A01D 41/14*    (2006.01)

(52) U.S. Cl.
CPC ......... *A01D 41/148* (2013.01); *A01D 41/145* (2013.01)

(58) Field of Classification Search
CPC .... A01D 41/148; A01D 41/145; A01D 41/14; A01D 75/00; A01D 67/00; B60P 3/066; A01B 73/00
See application file for complete search history.

(56) References Cited

U.S. PATENT DOCUMENTS

| | | | | |
|---|---|---|---|---|
| 4,845,931 A * | 7/1989 | Bruner | ................. | A01D 41/141 56/208 |
| 5,243,810 A * | 9/1993 | Fox | ...................... | A01B 73/005 56/14.4 |
| 5,337,544 A * | 8/1994 | Lauritsen | ............... | A01D 67/00 56/15.7 |
| 5,562,167 A * | 10/1996 | Honey | .................. | A01B 73/00 16/18 R |
| 7,404,283 B2 * | 7/2008 | Viaud | .................. | A01D 41/148 56/15.5 |
| 7,430,846 B2 * | 10/2008 | Bomleny | ............. | A01D 41/141 56/10.2 E |
| 7,661,251 B1 * | 2/2010 | Sloan | ................... | A01D 41/141 56/10.2 E |
| 7,908,838 B2 * | 3/2011 | Hohlfeld | .............. | A01D 43/081 56/228 |
| 7,971,420 B1 * | 7/2011 | Bollin | ................. | A01D 41/145 56/208 |
| 9,125,343 B2 * | 9/2015 | Duquesne | ............. | A01D 41/16 |

(Continued)

*Primary Examiner* — Arpad Fabian-Kovacs
(74) *Attorney, Agent, or Firm* — Adrian D. Battison; Ade & Company Inc; Ryan W. Dupuis

(57) ABSTRACT

A harvesting header is operable in a first mode of operation by engagement of a skid at the cutter bar for cutting along the ground. A gauging system operable in a second mode includes four ground engaging members supporting the header such that the cutter bar skid plate is at a controlled distance from the ground. The ground engaging members include a long skid and removable gauge wheels are carried on an elongate beam pivoted adjacent the cutter bar and extending to the rear of the frame and adjustable by an upstanding telescopic mast up to a position to allow the cutter bar to run on the ground. A resilient suspension can be provided at the rear of the beam at the junction to the post. The location under the table allows a very high adjustment of the cutter bar in the second mode.

17 Claims, 14 Drawing Sheets

(56) References Cited

U.S. PATENT DOCUMENTS

| | | | | |
|---|---|---|---|---|
| 9,693,505 | B2* | 7/2017 | Bassett | A01D 57/20 |
| 2003/0074876 | A1* | 4/2003 | Patterson | A01D 41/14 |
| | | | | 56/257 |
| 2004/0200203 | A1* | 10/2004 | Dow | A01B 73/02 |
| | | | | 56/375 |
| 2008/0072560 | A1* | 3/2008 | Talbot | A01D 41/14 |
| | | | | 56/208 |
| 2010/0043368 | A1* | 2/2010 | Sloan | A01D 41/141 |
| | | | | 56/10.2 E |
| 2010/0115906 | A1* | 5/2010 | Tilly | A01B 73/00 |
| | | | | 56/228 |
| 2010/0281837 | A1* | 11/2010 | Talbot | A01D 41/141 |
| | | | | 56/10.2 E |
| 2014/0041351 | A1* | 2/2014 | Bollin | A01D 41/127 |
| | | | | 56/10.2 E |
| 2014/0237980 | A1* | 8/2014 | Verhaeghe | A01D 41/145 |
| | | | | 56/320.1 |
| 2015/0033692 | A1* | 2/2015 | Schroeder | A01D 34/008 |
| | | | | 56/10.2 E |
| 2015/0271999 | A1* | 10/2015 | Enns | G05B 15/02 |
| | | | | 700/275 |
| 2016/0165799 | A1* | 6/2016 | Missotten | A01D 41/14 |
| | | | | 56/229 |
| 2016/0183460 | A1* | 6/2016 | Missotten | A01D 41/145 |
| | | | | 56/229 |
| 2016/0183461 | A1* | 6/2016 | Neudorf | A01D 41/14 |
| | | | | 56/158 |
| 2018/0070531 | A1* | 3/2018 | Long | A01D 34/006 |
| 2018/0098491 | A1* | 4/2018 | Long | A01D 34/006 |

* cited by examiner

AGRICULTURAL HEADER WITH GROUND ENGAGING GAUGE MEMBERS FOR ABOVE GROUND CUTTING

The present invention relates to an agricultural header for cutting a standing crop where the header includes ground engaging gauge members in the form of skids or wheels for supporting the cutter bar at a position spaced from the ground.

BACKGROUND

U.S. Pat. No. 6,675,568 by Patterson et al discloses and U.S. Pat. No. 8,245,489 by Talbot discloses a height control arrangement using gauge wheels supported at opposing ends of a rigid header. The gauge wheels serve to minimize any substantial deviations from a central controlled height of the header at the outboard ends of the header, however the system is only effective when used on a rigid header or a flexible header which is kept rigid. Published Application 2016/0183461 published Jun. 30 2016 by Neudorf discloses a gauge wheel system for attachment to a harvesting header. The disclosures of the above documents are all incorporated herein by reference.

SUMMARY OF THE INVENTION

According to one aspect of the invention there is provided a crop harvesting header comprising:

a main frame structure extending across a width of the header;

a mounting assembly for carrying the main frame structure on a propulsion vehicle by which the header is transported in movement in a forward direction generally at right angles to the width across ground including a crop to be harvested;

a crop receiving table carried on the main frame structure across the width of the header;

a cutter bar across a front of the table arranged to move over the ground in a cutting action and carrying a sickle knife operable for cutting the crop as the header is moved forwardly across the ground for depositing the crop onto the table;

a skid element on the main frame structure for engaging the ground so as to receive lifting forces from the ground;

the skid element located behind the cutter bar and extending along the length of the cutter bar so that the cutter bar is supported adjacent the ground for cutting crop close to the ground as the skid element slides over the ground;

a crop transport system on the table for moving the cut crop toward a discharge location of the header;

the harvesting header being operable in a first mode of operation with the skid element engaging the ground and the cutter bar adjacent the ground and in a second mode of operation with the skid element and the cutter bar raised away from the ground;

the main frame structure including a center frame portion, a first wing frame portion and a second wing frame portion;

the first wing frame portion being connected to the center frame portion by a first pivot coupling which provides pivotal movement of the first wing frame portion relative to the center frame portion about a first pivot axis extending in a plane generally parallel to the toward direction;

the first pivot coupling acting to support weight from the first wing frame portion while outboard weight from the first wing frame portion outboard of the first pivot coupling rotates the first wing frame portion about the first pivot coupling in a downward direction;

the second wing frame portion being connected to the center frame portion by a second pivot coupling which provides pivotal movement of the second wing frame portion relative to the center frame portion about a second pivot axis extending in a plane parallel to the toward direction;

the second pivot coupling acting to support weight from the second wing frame portion while outboard weight from the second wing frame portion outboard of the second pivot coupling rotates the second wing frame portion about the second pivot coupling in a downward direction;

the mounting assembly including a float suspension system connected to the center frame portion providing a variable lifting force from the propulsion vehicle acting to support the main frame structure for floating movement relative to the propulsion vehicle;

a first interconnecting float linkage connected between the center frame portion and the first wing frame portion which communicates a first variable lifting force from the center frame portion to the first wing frame portion against the outboard weight of the first wing frame portion;

a second interconnecting linkage connected between the center frame portion and the second wing frame portion which communicates a second variable lifting force from the center frame portion to the second wing frame portion against the outboard weight of the second wing frame portion;

in the first mode of operation with the skid element engaging the ground, the float suspension system and first and second interconnecting linkages provide a downforce from the skid element on the ground which is balanced between the center frame portion and the first and second wing frame portions;

and a gauging system used in the second mode of operation comprising:

a first ground engaging member supported on the first wing frame portion at a location spaced outwardly from the center frame portion for engaging the ground so as to receive lifting forces from the ground;

a second ground engaging member supported on the second wing frame portion at a location spaced outwardly from the center frame portion for engaging the ground so as to receive lifting forces from the ground; and additional ground engaging members supported on the main frame structure proximate the center frame portion for engaging the ground so as to receive lifting forces from the ground;

each of the ground engaging members having a surface arrangement engaging the ground at a position rearwardly of the cutter bar such that, in the second mode of operation, the first, second and additional ground engaging members collectively support the skid element spaced above the ground while the first and second wing frame portions pivot relative to the center frame portion in response to changes in ground height;

wherein each of the surface arrangements is mounted on an elongate support member connected at a forward end adjacent to and rearwardly of the cutter bar for pivotal movement about an axis parallel to the cutter bar and extending rearwardly therefrom;

the elongate support member being arranged to be raised and lowered to raise and lower the surface arrangement;

wherein each of the surface arrangements is fully retractable by raising of the elongate support member to a height underneath the table to cause the skid element to engage the ground.

According to one aspect of the invention there is provided a crop harvesting header comprising:

a main frame structure extending across a width of the header;

a mounting assembly for carrying the main frame structure on a propulsion vehicle by which the header is transported in movement in a forward direction generally at right angles to the width across ground including a crop to be harvested;

a crop receiving table carried on the main frame structure across the width of the header;

a cutter bar across a front of the table arranged to move over the ground in a cutting action and carrying a sickle knife operable for cutting the crop as the header is moved forwardly across the ground for depositing the crop onto the table;

a skid element on the main frame structure for engaging the ground so as to receive lifting forces from the ground;

the skid element located behind the cutter bar and extending along the length of the cutter bar so that the cutter bar is supported adjacent the ground for cutting crop close to the ground as the skid element slides over the ground;

a crop transport system on the table for moving the cut crop toward a discharge location of the header;

the harvesting header being operable in a first mode of operation with the skid element engaging the ground and the cutter bar adjacent the ground and in a second mode of operation with the skid element and the cutter bar raised away from the ground;

the mounting assembly including a float suspension system connected to the center frame portion providing a variable lifting force from the propulsion vehicle acting to support the main frame structure for floating movement relative to the propulsion vehicle;

and a gauging system used in the second mode of operation comprising a first, second, third and fourth ground engaging member each supported on the main frame structure for engaging the ground so as to receive lifting forces from the ground with the first and fourth ground engaging members arranged at or adjacent outer ends of the main frame structure and with the second and third ground engaging members arranged at spaced positions inboard of the outer ends;

each of the ground engaging members having a surface arrangement engaging the ground at a position rearwardly of the cutter bar such that, in the second mode of operation, the ground engaging members collectively support the skid element spaced above the ground;

wherein each of the ground engaging members is mounted on an elongate support member connected at a forward end adjacent to and rearwardly of the cutter bar for pivotal movement about an axis parallel to the cutter bar and extending rearwardly therefrom;

the elongate support member being arranged to be raised and lowered to raise and lower the surface;

wherein each of the elongate support members extends rearwardly under the table to a rear end rearward of the table and there is provided an upstanding extendible member connected at a lower end to the elongate support member and to the frame structure above the lower end and rearward of the table to raise and lower the cutter bar relative to the ground.

According to one aspect of the invention there is provided a crop harvesting header comprising:

a main frame structure extending across a width of the header;

a mounting assembly for carrying the main frame structure on a propulsion vehicle by which the header is transported in movement in a forward direction generally at right angles to the width across ground including a crop to be harvested;

a crop receiving table carried on the main frame structure across the width of the header;

a cutter bar across a front of the table arranged to move over the ground in a cutting action and carrying a sickle knife operable for cutting the crop as the header is moved forwardly across the ground for depositing the crop onto the table;

a skid element on the main frame structure for engaging the ground so as to receive lifting forces from the ground;

the skid element located behind the cutter bar and extending along the length of the cutter bar so that the cutter bar is supported adjacent the ground for cutting crop close to the ground as the skid element slides over the ground;

a crop transport system on the table for moving the cut crop toward a discharge location of the header;

the harvesting header being operable in a first mode of operation with the skid element engaging the ground and the cutter bar adjacent the ground and in a second mode of operation with the skid element and the cutter bar raised away from the ground;

the mounting assembly including a float suspension system connected to the center frame portion providing a variable lifting force from the propulsion vehicle acting to support the main frame structure for floating movement relative to the propulsion vehicle;

and a gauging system used in the second mode of operation comprising a first, second, third and fourth ground engaging member each supported on the main frame structure for engaging the ground so as to receive lifting forces from the ground with the first and fourth ground engaging members arranged at or adjacent outer ends of the main frame structure and with the second and third ground engaging members arranged at spaced positions inboard of the outer ends;

each of the ground engaging members having a surface arrangement engaging the ground at a position rearwardly of the cutter bar such that, in the second mode of operation, the ground engaging members collectively support the skid element spaced above the ground;

wherein each of the ground engaging members is mounted on an elongate support member connected at a forward end adjacent to and rearwardly of the cutter bar for pivotal movement about an axis parallel to the cutter bar and extending rearwardly therefrom;

the elongate support member being arranged to be raised and lowered to raise and lower the surface arrangement;

wherein the surface arrangement includes at least a positon in contact with the ground which is toward of the rear of the table;

and wherein the mounting assembly includes a tilt cylinder connected to the frame structure of the header for tiling the frame structure and the cutter bar earned thereby forwardly and rearwardly;

and wherein common operation of the lowering of the elongate support members and the tilt cylinder causes the cutter bar to be raised such that the cutter bar is located at a cutting height from the ground of greater than 12 inches.

The arrangements defined above are preferably used in a header construction wherein:

the main frame structure includes a center frame portion, a first wing frame portion and a second wing frame portion;

the first wing frame portion is connected to the center frame portion by a first pivot coupling which provides pivotal movement of the first wing frame portion relative to the center frame portion about a first pivot axis extending in a plane parallel to the forward direction;

the first pivot coupling acts to support weight from the first wing frame portion while outboard weight from the first wing frame portion outboard of the first pivot coupling rotates the first wing frame portion about the first pivot coupling in a downward direction;

the second wing frame portion is connected to the center frame portion by a second pivot coupling which provides pivotal movement of the second wing frame portion relative to the center frame portion about a second pivot axis extending in a plane parallel to the forward direction;

the second pivot coupling acts to support weight from the second wing frame portion while outboard weight from the second wing frame portion outboard of the second pivot coupling rotates the second wing frame portion about the second pivot coupling in a downward direction;

the mounting assembly includes a float suspension system connected to the center frame portion providing a variable lifting force from the propulsion vehicle acting to support the main frame structure for floating movement relative to the propulsion vehicle;

a first interconnecting float linkage is connected between the center frame portion and the first wing frame portion which communicates a first variable lifting force from the center frame portion to the first wing frame portion against the outboard weight of the first wing frame portion;

a second interconnecting linkage is connected between the center frame portion and the second wing frame portion which communicates a second variable lifting force from the center frame portion to the second wing frame portion against the outboard weight of the second wing frame portion;

in the first mode of operation with the skid element engaging the ground, the float suspension system and first and second interconnecting linkages provide a downforce from the skid element on the ground which is balanced between the center frame portion and the first and second wing frame portions.

However the header can also be of a structure which uses a rigid frame or where the frame is fixed so as to be rigid when used in a particular mode.

It is more preferable that the cutting height in the second mode is greater than 14 inches.

Preferably in this arrangement the first and second ground engaging members are mounted at respective outer ends of the first and second wing frame portions additional ground engaging members are mounted on the first wing frame portion closely adjacent to the pivot axis and closely adjacent the pivot axis, and the center frame portion is supported only by said float suspension system and not by any additional ground engaging members.

Preferably each of the elongate support members extends rearwardly under the table to a rear end rearward of the table and there is provided an upstanding extendible member connected at a lower end to the elongate support member and to the frame structure above the lower end and rearward of the table to raise and lower the cutter bar relative to the ground.

Preferably the extendible member comprises a pair of telescopic members with an outer with an inner member slidable within an outer member, wherein the inner member has a plurality of longitudinally spaced holes for receiving a pin of the outer member to locate the inner and outer members at an extension position defined by the selected hole, wherein the holes are spaced transversely of the inner member and the pin is carried on a rotatable member which acts when rotated to move the pin transversely across the outer member so that the transverse position of the pin when rotated acts automatically to select one of the holes of the inner member.

Preferably the main frame structure includes a frame beam and a plurality of frame members located at spaced positions across the main frame structure;

each frame member extending from the frame beam in a first portion downwardly behind the table and in a second portion forwardly under the table to support the cutter bar;

the second portion forming a channel member with a downwardly facing open face;

the elongate support members each being located in a second portion of a respective one of said frame members and extending rearwardly under the table.

Preferably each of the ground engaging surface arrangements is located under the table.

Thus one key feature is that the system mounts a skid or skid and wheel on a long arm which is attached to an upstanding actuator at the rear of the frame. Another key feature relates to the location and arrangement of the skid and wheel in relation to the fact that it is pivoted at the front on a lug at the frame and is carried on a beam which is attached to an upstanding adjustable leg (cylinder or telescope) at the back of the frame.

Another key feature relates to the location and arrangement of the skid and/or wheel so that the wheel can be fully retracted to allow the header to operate in the first mode with the cutter bar and skid element on the ground.

Another key feature relates to the long skid which extends from the pivot just behind the cutter bar right back to the rear of the table or at the upstanding adjustment post.

One system uses four wheel assemblies (one at each end of the header and one adjacent to or more particularly just outside or just inside of the two hinge locations near the center of the header. The wheel assemblies pivot near the cutter bar and have a short skid that is part of the structure that the header rides on when cutting directly on or close to the ground. The adjustment of all four wheel assemblies is done at the rear of the header.

The long skid, like the wheel assembly, is located at each end of the header and also near each hinge point for a total of four skids. These skids also pivot at the cutter bar with an adjustment mechanism at the rear of the header.

For the height adjustment of the wheel/skids, this can be effected by a mechanical adjustment using a telescoping tube with a series of holes and a pin that can be used to position the wheels or skids to a predetermined height. A second option is the use of hydraulic cylinders that replace the mechanical adjuster and a switch in the combine cab that allows the operator to adjust the wheel height using the combine's hydraulics.

For both the wheels and the skids using either the mechanical or hydraulic adjuster, a maximum cut height of approximately 14 to 18 inches can be achieved. In addition, with the wheels or skids being fully retracted while remaining in place on the header, the operator can cut with the cutter bar/skid element touching the ground without ever needing to remove the wheels/skids from the header.

The three section frame is designed to cut on the ground and such that the cutter bar pressure is consistent or balanced across the full length of the cutter bar by means of a balance linkage that uses the weight of the header to balance the weight of the wings. This works very well for crops like soybeans, peas, lentils, where it is desirable to out as close to the ground as possible. In these crops, the cutter bar is skidded along the ground and the flex balance linkage and header float system allow the header to follow contours with minimal pressure between the cutter bar and the ground. Current standard skid shoes provide some cutter bar height adjustment in the order of up to 5 inches.

In crops like cereals it is sometimes desirable to cut at a height of up to 14 to 18 inches while following the ground contour. Furthermore, it is desirable to easily go from cutting at this height, and back to cutting on the ground with minimal effort. It is thus desirable for the device that allows for cutting off the ground to stay on the header when cutting on the ground, and for the adjustment to be quick and easy.

The device includes contour wheels or long skid shoes. It consists of four separate assemblies located such that the skid shoe or wheel assembly make contact with the ground and cause the header to flex and follow the contour of the ground, much like the header does when cutting on the ground. The locations of the wheels or long skid shoes is such that they provide enough of a moment about the virtual balance points of the flex header to overcome friction and cause the header to flex. This virtual balance point is located on the header wing, approximately one third the distance from the hinge point to the end of the header.

There are a total of four wheel assemblies across the width of the header. Two are at each end of the header, and two are near the hinge points as displayed in FIG. 2. These locations ensures enough moment about the virtual balance point of the header to overcome friction and cause the header to flex. This allows the operator to use the header while in flex mode in order to achieve better ground following while cutting as high as 18 inches off the ground. Ground following was previously only possible while cutting with the cutter bar resting on the ground or else on the short skid shoes for a maximum height of 5 inches.

The wheel assemblies can also be used on a header that does not have a flexing frame in that the frame is rigid or the flexing action is locked out. In this case, there may be only two assemblies used and the wheels allow the operator to maintain consistent cut height from pass to pass, however cut height variation can still occur due to changing ground contours across the width of the header.

The wheel assembly contains an isolator or suspension system to aid in eliminating header bounce and stress on components as the wheels travel over bumps and other incompressible objects. One embodiment of the isolator consists of a torsional rubber isolator which is mounted to the elongate support member that spans from the cutter bar to the rear adjuster. In this case, the wheel assembly contains two links bolted to the torsional isolator. As the wheel strikes an object, the links convert the force into a moment which causes the isolator to rotate and absorb the load. Other means of providing shock absorption such as a rubber block, or spring and shock absorber or accumulator can be used.

The means of adjusting the height of the wheel assembly can be a manual adjuster or a hydraulic wheel height adjustment system. With the manual adjuster, the operator sets all four adjusters to a height which is close to the desired cut height and fine adjustments can then be made to the cut height by changing the tilt of the header using the tilt cylinder that attaches the header to the adapter. With the hydraulic adjustment which contains four hydraulic cylinders in a series circuit in a master slave arrangement, and a switch in the combine cab, the operator can adjust the height of the wheels by actuating the cylinders using the in cab switch while harvesting and can adjust the tilt to obtain an increase in the height using the same switch.

One embodiment of the manual adjuster includes two telescoping tubes with a pin adjustment system to lock the position. In one embodiment, the outer tube utilizes a series of holes in a circular pattern with each of the holes aligning with one of the holes on the inner tube. This arrangement allows the user to select the height of the adjuster by pulling the pin and rotating the pin holder to the desired setting after which the inner tube can either be extended or retracted until the pin engages in the hole on the inner tube.

Where the ground engaging member comprises a long skid shoe, this comprises a skid member positioned such that the header rides on the shoes when in cutting position. The operator may choose to retract the shoes such that the header can cut on the ground, effectively removing the long skid shoes from operation. This enables the operator to adjust cut height such that a desired stubble length can be achieved. The embodiment shown allows for a stubble height ranging from 1.25 inch up to 14 inches. This allows a flexible or rigid header to maintain a consistent cutter bar to ground spacing. In the case of a rigid header, cut height can still vary due to uneven ground across the full width of the header. The skid may use metal, poly, or other desirable material as the ground contacting surface. This surface may be either permanent or replaceable. The means of adjusting the cut height is the same as described above with the contour wheels by means of a manual or automatic method, either using hydraulic or electric components. The long shoe may either be integrated into standard short skid shoes near the front of the header, or exist in addition to short standard skid shoes.

In another embodiment, the device can comprise the long skid shoe, with the addition of a ground-contacting wheel or wheels mounted on each side of the skid.

The wheels can be permanently attached to the skid shoe, removable, or retractable as desired. The wheels may be supported in a variety of ways, including but not limited to a rotational damping arm. The wheel may consist of a variety of materials, including a solid material or a pneumatic wheel. The wheel may be fixed position or include an adjustable member such that the wheel's position in proximity to the shoe may be altered. The wheel may be used to increase the stubble height beyond the range of the shoe. In this embodiment, 18 inches can be achieved using the wheels. The wheel offers all of the benefits of the skid shoe, while increasing the life of the device in abrasive conditions, as well as reducing friction and increasing cut height.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
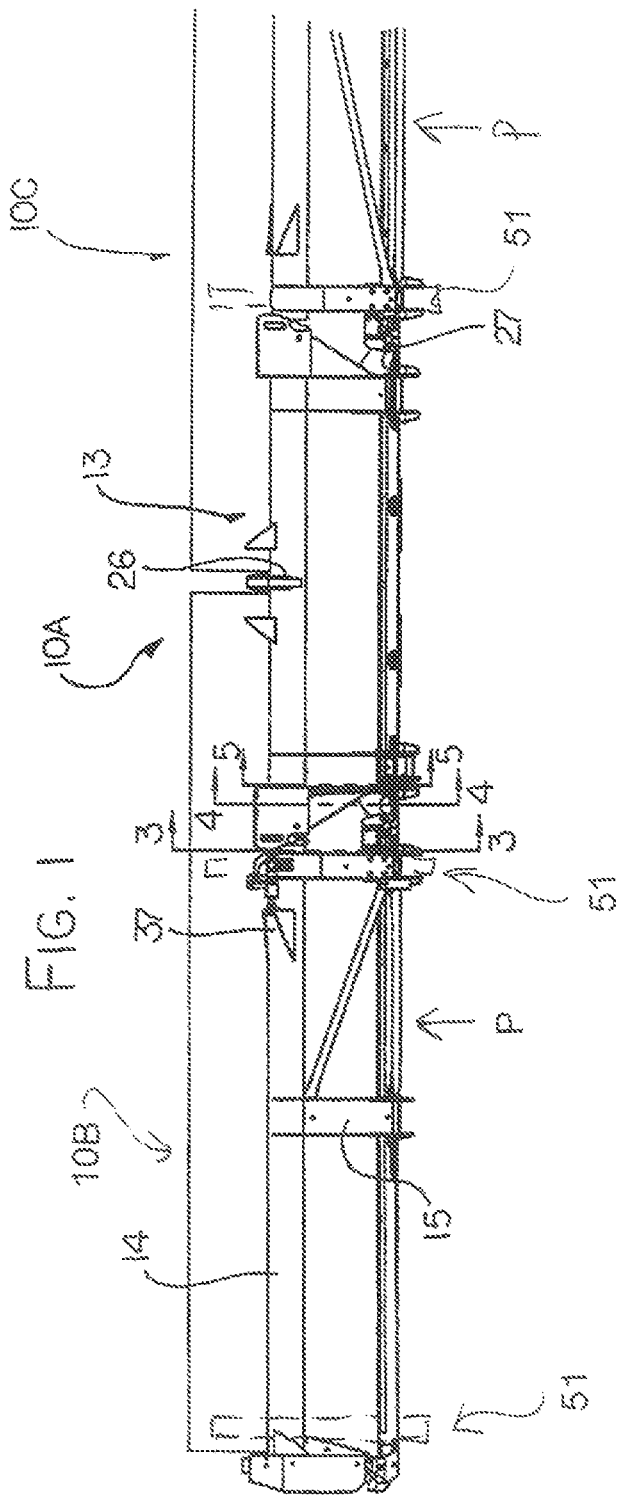
FIG. 1 is a rear elevational view of a prior art multi-section header.

Referring to the accompanying figures, there is illustrated a gauge system generally indicated by reference numeral 5. The gauge system is particularly suited for use with an agricultural header 10 manufactured by Macdon Industries Ltd, under the model number FD70/FD75/FD1/FD2. U.S. Pat. No. 6,675,568 by Patterson et al, the disclosure of which is incorporated herein by reference discloses the general operation of the header. For convenience, FIGS. 1 through 3 from U.S. Pat. No. 6,675,568 are attached herewith and some of the description with regard to operation of the header from U.S. Pat. No. 6,675,568 is reproduced in the following.

Figure 2:
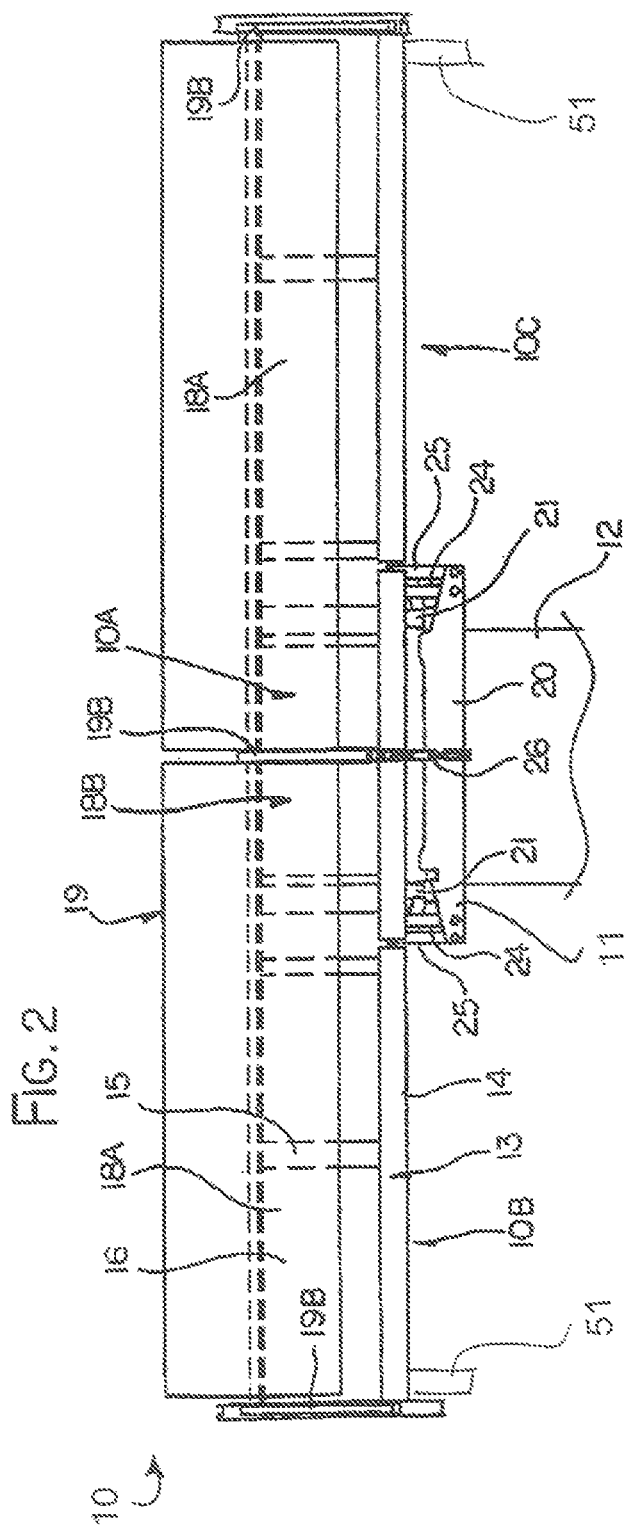
FIG. 2 is a top plan view of the prior art multi-section header according to FIG. 1.
Figure 3:
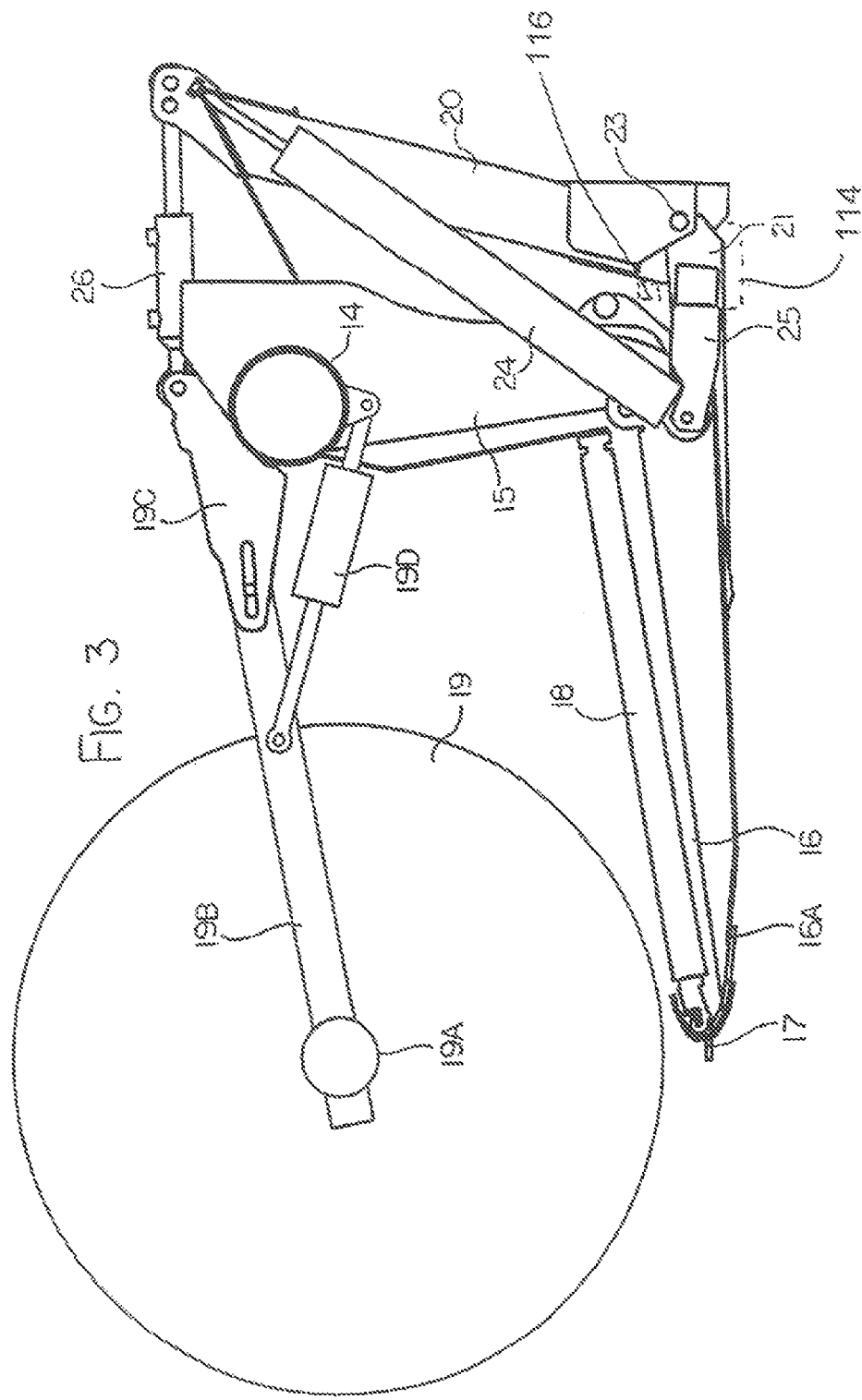
FIG. 3 is an end elevational view of the multi-section header according to FIG. 1.

FIGS. 1 and 2 show in rear elevational view and in plan view respectively the header 10 carried on an adapter 11 attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the toward end of the table 16 is provided a cutter bar 17. On top of the table 18 is provided a draper transport system 18 which carries the crop from the cutter bar across the header to a discharge location at the feeder house 12. The draper thus include two side drapers extending from respective ends of the header inwardly toward the feeder house and a center adapter section 18B which acts to feed the crop from the side drapers 18A rearwardly to the feeder housing.

Reference is made to prior application Ser. No. 09/810, 425 filed Mar. 19, 2001 and to application Ser. No. 09/965, 119 filed Sep. 28, 2001 which disclose details of the adapter and its inter relation to the side drapers 18A, the disclosure of which is incorporated herein by reference.

The header further includes a reel 19 including a beam 19A on which is mounted a plurality of reel bats (not shown) which are carried on the beam 19A for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

In the embodiment shown the reel is mounted on three arms 19B including two arms at the ends of the header and a single center arm. However additional arms may be provided so that there are four such arms with two center arms being spaced apart either side of the adapter 11. It is well known to provide an arrangement of the beam 19A and the bats which accommodate flexing movement of the reel so that one end can be higher than the other end without damaging the bats or the reel structure. Various different arrangements for accommodating such flexing movement are known and can be incorporated into the arrangement described herein, as is well known to one skilled in the art.

The adapter 11 provides a center support for the header at a center frame portion 10A and comprises a frame 20 which attaches to the feeder house 12 and carries at its lower end a pair of forwardly extending pivotal arms 21 which extend forwardly underneath respective ones of the frame members 15 of the header. The pivotal arms 21 can pivot upwardly and downwardly about a respective pivot pins 23 each independently of the other arm. Each arm is supported by a respective spring 24 carried on a respective stub arm 25 attached to the respective arm 21. Thus the spring 24 provides tension on the stub arm 25 pulling it upwardly around the pin 23 which acts to pull up the respective arm 21 and provide a lifting force underneath the header at a lifting point partway along the respective frame member 15 and underneath the draper 18 and the table 16.

At the center of the adapter is provided a link 26 which extends from the frame 20 forwardly to the central bracket 19C of the beam arm support brackets. The link 26 is provided in the form of a hydraulic tilt cylinder which allows adjustment of the length of the cylinder thus pivoting the header forwardly and rearwardly about the support point of the arms 21 on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms 21 provided by the springs 24 which act as a floatation system. In addition the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A typically including a polymeric wear shield which is arranged to engage the ground. Thus upward force is provided from the ground which tends to lift the header taking weight off the support springs 24. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs 24. Thus the header tends to follow the ground level.

The header is formed in a number of sections which are independently pivotal each relative to the next and in which adjustment of the lifting force provided by the springs 24 is transferred to each of the sections proportionally so that each section can float upwardly and downwardly and each section applies a force to the ground which is proportional to the total force of the whole header.

Thus the beam 14 is divided into a number of separate pieces depending upon the number of sections of the header. In the embodiment shown there are three sections including a center frame portion or section 10A carried on the propulsion vehicle by the adapter or center support 11, a first wing frame portion or section 10B and a second wing frame portion or section 10C. The center section 10A is mounted at the adapter so that the arms 21 extend into engagement with the center section. The wing sections are pivotally connected to the center section such that each can pivot upwardly and downwardly about a respective pivot axis generally parallel to the direction of movement.

Thus the beam 14 is split into three portions each co-operating with a respective one of the sections 10A, 10B and 10C and defining a main beam therefor. Each section of the beam 14 includes respective ones of the frame members 15 which support the respective portion of the table. Thus as best shown in FIG. 1, there is a break between the beam sections 14 of the center section 10A and one wing section 10B. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin 27A lying on the pivot axis between the wing section 10B and the center section 10A. In a rear elevational view, the cutter bar 17 is also visible underneath the header at the forward end of the frame members 15 and at the front of the table 16.

In the embodiment shown the cutter bar 17 is split at a junction lying along the axis of a hinge pin so as to provide a pivot within the cutter bar allowing the cutter bar to bend at the junction.

In an alternative arrangement (not shown) the cutter bar can be formed in a manner which allows it to flex on the axis of the pin thus avoiding the necessity for a break in the cutter bar.

The cutter bar is of conventional shape including a U shaped member with generally horizontal legs and a front curved nose to which is attached the knife support flange of a conventional nature. The knife support flange includes a plurality of holes for mounting conventional knife guards.

A bridging link is connected across the break so as to hold the sections of the cutter bar 17 aligned while the pivotal movement occurs. The link comprises a plate welded to one part of the cutter bar with the link or plates spanning the break and extending to a pin which is welded to the other part of the cutter bar with the link being held in place by a nut.

Thus the two sections 10A and 10B are supported each relative to the other for pivotal movement of the wing section 10B about an axis extending through the hinge pin and through the break in the cutter bar 17 so that the wing section is supported at its inner end on the center section but can pivot downwardly at its outer end so that the weight at the outboard end is unsupported by the center section and causes downward or counter clockwise pivotal movement of the wing section 10B.

The wing section 10C is mounted in an identical or symmetrical manner for pivotal movement about the other end of the center section 10A. The amount of pivotal movement allowed of the wing section relative to the center section about the axis of the pivot pin is maintained at a small angle generally less than 6° and preferably less than 4° as controlled by suitable mechanical stop members which are provided at a suitable location with the required mechanical strength to support the wing frame section against upward or downward movement beyond the stop members. Suitable stop members can be designed by a person skilled in the art and the details of the stop members are not described herein.

Figure 4:
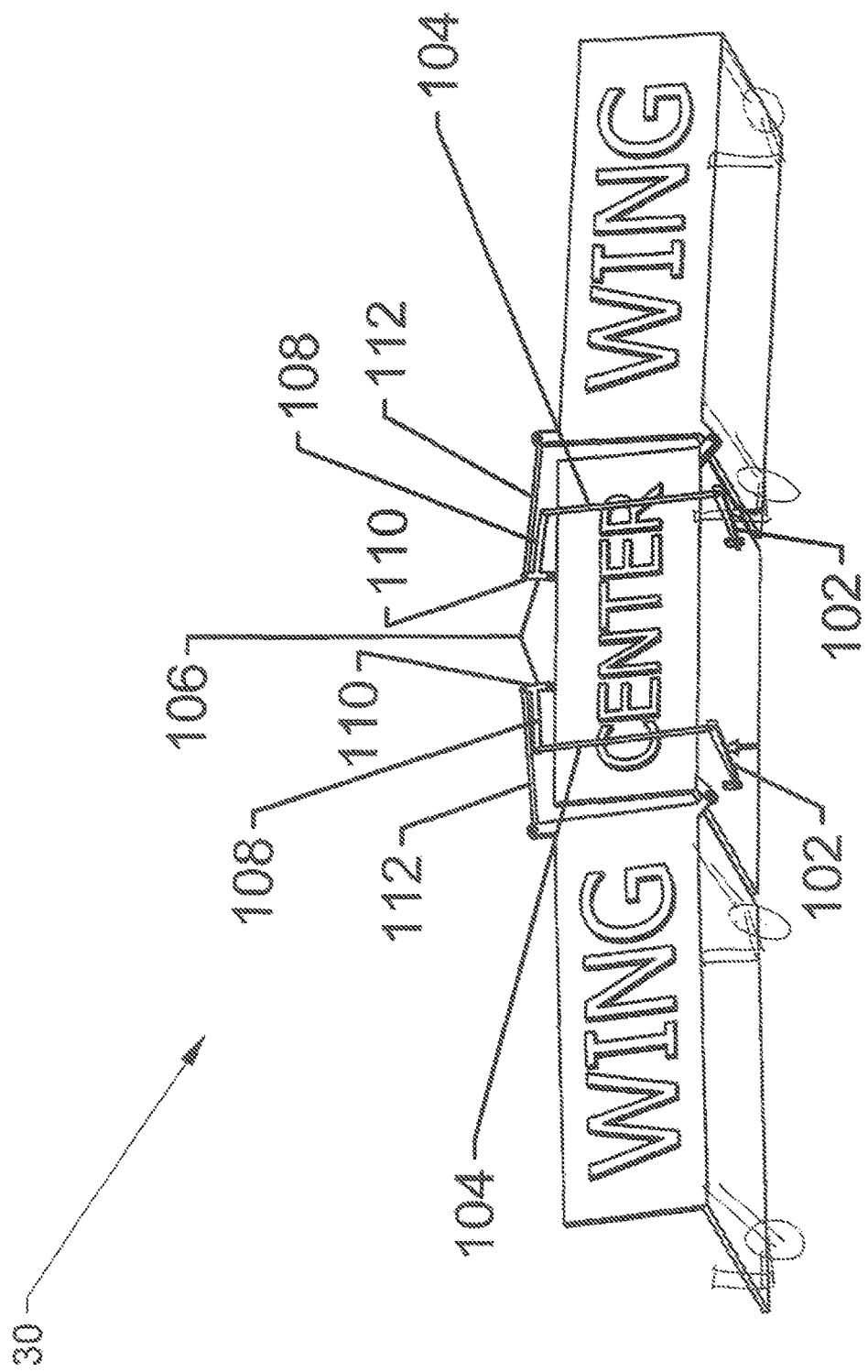
FIG. 4 is a schematic representation of the balancing linkage of the multi-section header according to FIG. 1.

The outboard weight of the wing section 10B is supported on an interconnecting linkage 30 which communicates that weight from the inner end of the beam 14 of the section 10B through to the support for the center section 10A at the springs 24. The linkage is shown particularly in FIGS. 4 and 5 as described in further detail below.

In general the linkage operates to transfer the outboard weight of the wing section inwardly to the center section and at the same time to balance the lifting force provided by the springs 24 so that it is proportionally applied to the center section and to the wing section.

Thus in general the header is attached to the combine feeder house using the float system described previously that supports the header so that if can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99% of the header weight then the remaining 1% will be evenly distributed across the cutter bar. If the operator changes the float so that 85% is supported by the combine harvester then the remaining 15% would also be evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balance between the ends to ensure the even distribution across the cutter bar of each section and thus of all the sections. This provides an arrangement in which the force required to lift the header is the same force at any location along the length of the cutter bar, whether that location is at the center section, at a junction between the center section and the wing section or at the wing section. This is achieved in this embodiment by the balancing system which transfers lifting force between the sections with the forces being balanced by a balance beam of the linkages 30.

The header frame sections and the reel sections are hinged and supported so that the reel will stay in approximately the same position relative to the cutter bar. Thus the balance beam as described in more detail hereinafter balances the lifting force applied to the ends of the center section relative to the lifting force which is applied to the outboard weight of the wing section so that the lifting force is even across the width of the header. Thus if a lifting force is applied by the ground or any other lifting mechanism for example merely manually lifting the header at a particular location across its width, that would cause the header to rise at that point and to fail at other points. The amount of force necessary to lift the header at that point will be the same as it is at other points and this lifting force can be varied for the total header and proportioned across the width of the header automatically by the balance beams as described hereinafter.

It will be appreciated that the inboard weight of the wing section is transferred through the pivot 27 to the outboard end of the center section and that weight is transferred directly to the balance beam. Also the outboard weight of the wing section is transferred through the linkages 30. Yet further a lifting force from the arm 21 is applied to the balance beam.

The whole support assembly including the linkages 30, the lift arm 21 and the springs 24 are arranged to provide a floating movement for each of the first and second frame portions that is the center and wing frame portions relative to each other and relative to the propulsion vehicle such that upward pressure from the ground on the skid element 16A which is greater in a downward force for a part of the weight of the header and supported by the lifting force tends to lift each of the center and wing frame portions relative to the propulsion vehicle.

The balance beam arrangement is arranged such that the first and second lifting forces are varied proportionally as the total lifting force $F_T$ is varied.

The height of the header is primarily controlled by controlling the height of the feeder house 20 of the combine harvester relative to the ground using a height control mechanism 100. Typically the feeder house is pivotally supported on a main frame of the combine harvester and an actuator member is mounted between the feeder house and the main frame to raise and lower the feeder house.

The height of the main structure of the header is in turn supported for up and down movement relative to the adapter 11 by supporting the main frame structure on the pivot arms 21 which are supported for floating movement by the springs 24 by providing a total spring lifting force to the header. The linkages 30 in turn distribute this total spring force into a center lifting force $F_c$ which provides lift to the center frame section and the inboard ends of the wing frame sections pivotally coupled thereto as well as a first lifting force and a second lifting force acting upon the first and second wing frame sections respectively in a direction intending to cause the outboard ends of the wing frames to be raised upwardly.

The linkages 30 supporting the main frame structure on the pivot arms 21 comprises two balance linkages associated with the two pivot arms respectively. Each balance linkage includes a balance beam 102 pivotally supported at an intermediate location between front and rear ends on the forward ends of the pivot arms 21. The forward ends of the two balance beams 102 are pivotally connected to respective locations on the center section of the main frame structure at transversely spaced apart locations. The forward ends of the balance beams 102 serve to provide the center lifting force $F_c$ to the main frame structure. The opposing rear ends of the two balance beams 102 provide the first and second lifting forces to the first and second wing frame sections.

More particularly, the rear end of each balance beam 102 is pivotally connected to an upright compression link 104 which extends upwardly from the balance beam 102 below the main frame structure to a top end in proximity to a top end of the main frame structure. Each balance linkage further includes a bell crank 106 pivotally supported on the main frame structure adjacent the top end in which the bell crank includes a first lever 108 pivotally coupled to the top end of the respective compression link 104 and a second lever portion 110 extending upward to a pivot connection with a respective tension link 112.

Pivotal connection of the second lever 110 with the respective tension link 112 is located substantially directly above the pivotal connection of the bell crank to the main frame structure such that an upward force acting on the compression link 104 tends to rotate the bell crank in a direction corresponding to a laterally inward tension on the tension link 112 which is pivotally coupled at its outer end to a respective one of the wing frame sections which tends to pivot the wing frame section in a direction about its pivotal coupling to the center frame section in a direction corresponding to the outboard and of the wing frame section being raised upwardly.

The balance linkages 30 serve to balance the total lifting force provided by the combine harvester through the pivot arms 21 to the center lifting force at the forward ends of the balance beams 102 and the first and second lifting forces at the rear ends of the balance beams so as to vary the lifting forces as the total lifting force varies and so as to balance the lifting forces from the ground applied along the length of the skid element.

The header further includes a stop member 114 which is arranged to limit downward movement of the main frame structure of the header relative to the adapter. A distance sensor 116 is provided for sensing a distance of a point on the header which moves with the header in suspension movement relative to the bottom stop 114 which is stationary relative to the combine harvester. The distance sensor therefore generates a signal indicative of the sensed changes in the measured distance. The height control mechanism 100 which is arranged to raise and lower the feeder house of the combine harvester, receives the signal from the sensor 116 as an input and is automatically operated so as to attempt to maintain the sensed distance at a required set value. The set value is selected so that the header is free to float between the bottom stop and the upper limited movement both upwardly and downwardly to accommodate changes in ground height.

The gauge system 5 according to the present invention is particularly suited for use with the above described header 10 to permit the header to operate in a balanced manner with the wing sections floating relative to the center section when operating at a raised cutting height with the cutter bar and skid member 16A supported well above the ground.

Figure 7:
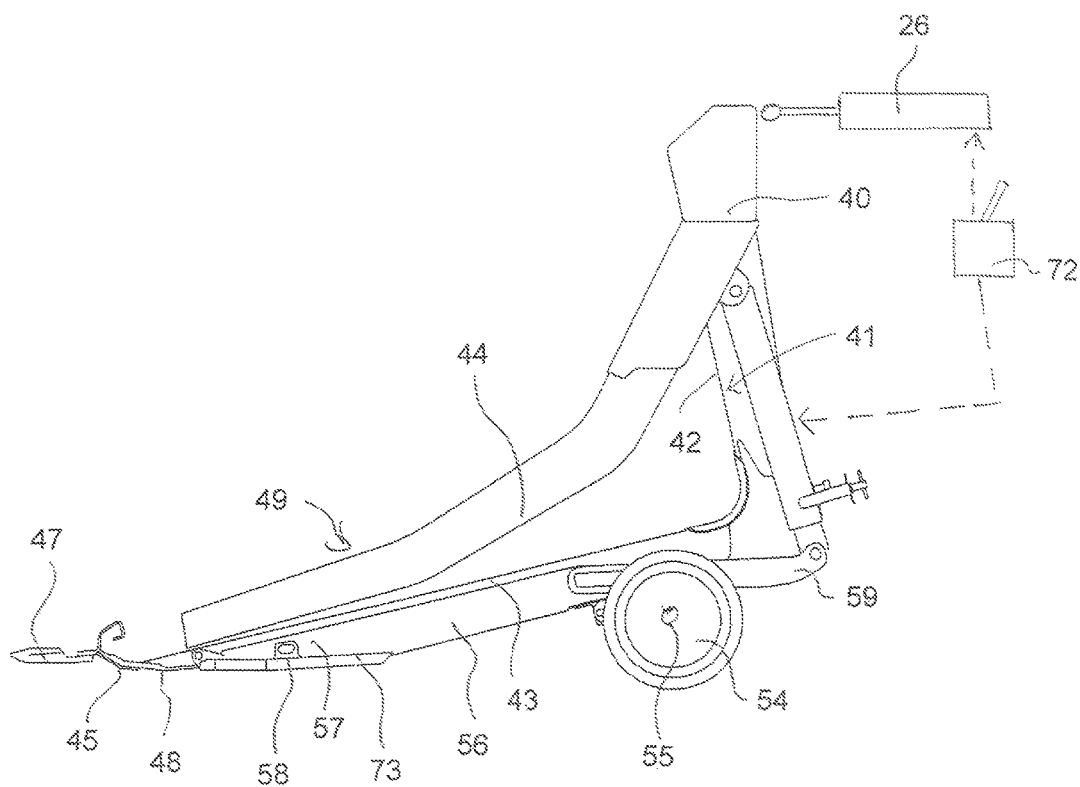
FIG. 7 is a side elevational view of the gauge wheel assembly of FIG. 6 located on a cross-sectional view of the header of FIGS. 1 to 5 showing the gauge wheel in the retracted position with the cutter bar in the ground position of the first mode.
Figure 8:
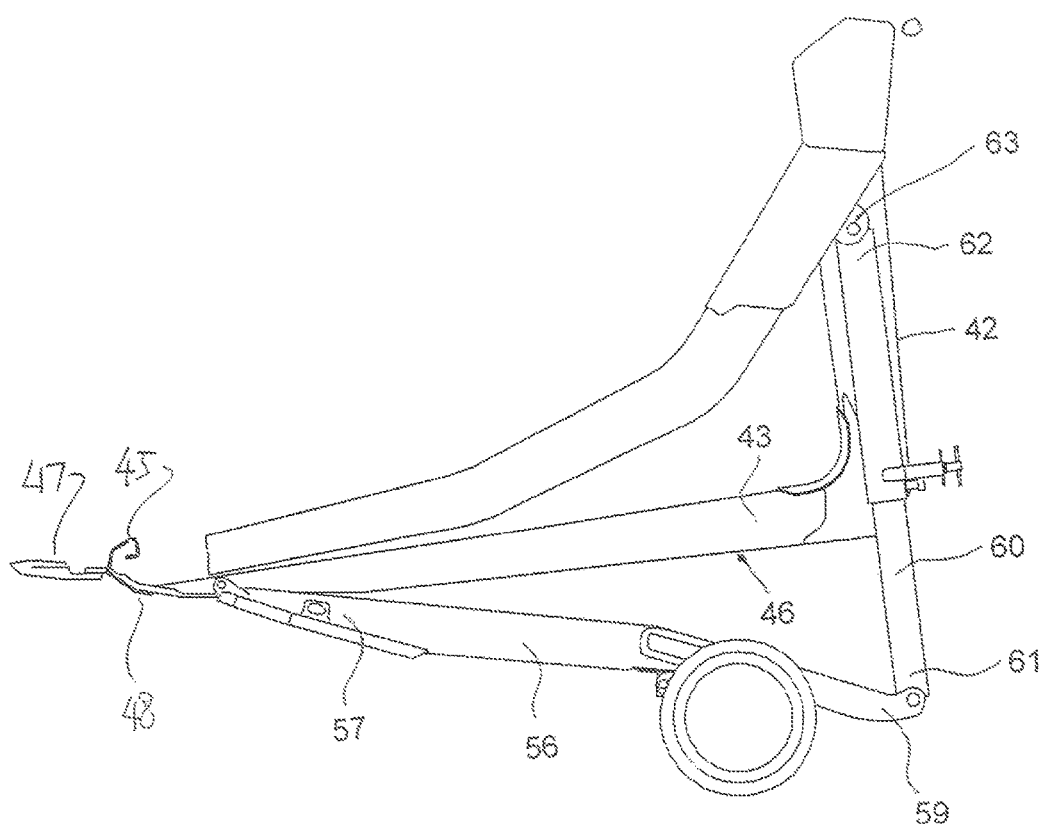
FIG. 8 is a side elevational view of the gauge wheel assembly of FIG. 6 located on a cross-sectional view of the header of FIGS. 1 to 5 showing the gauge wheel in the extended position with the cutter bar in the maximum raised position of the second mode.

Thus as shown in FIGS. 1 to 5 there is provided a crop harvesting header 10 with center and wing sections 10A, 10B and 10C. Each includes a main frame structure so that together the combined frame structure extends across a width of the header. The main frame structure as best shown in FIGS. 7 and 8 includes a main frame beam 40 across the rear at the top of the header and a plurality of frame members 41 located at spaced positions across the main frame structure. Each frame member 41 extends from the frame beam 40 in a first portion 42 downwardly behind the table 43 and in a second portion 44 forwardly under the table to support the cutter bar 45. The second portion 43 forms a channel member with a downwardly facing open face 46.

Figure 5:
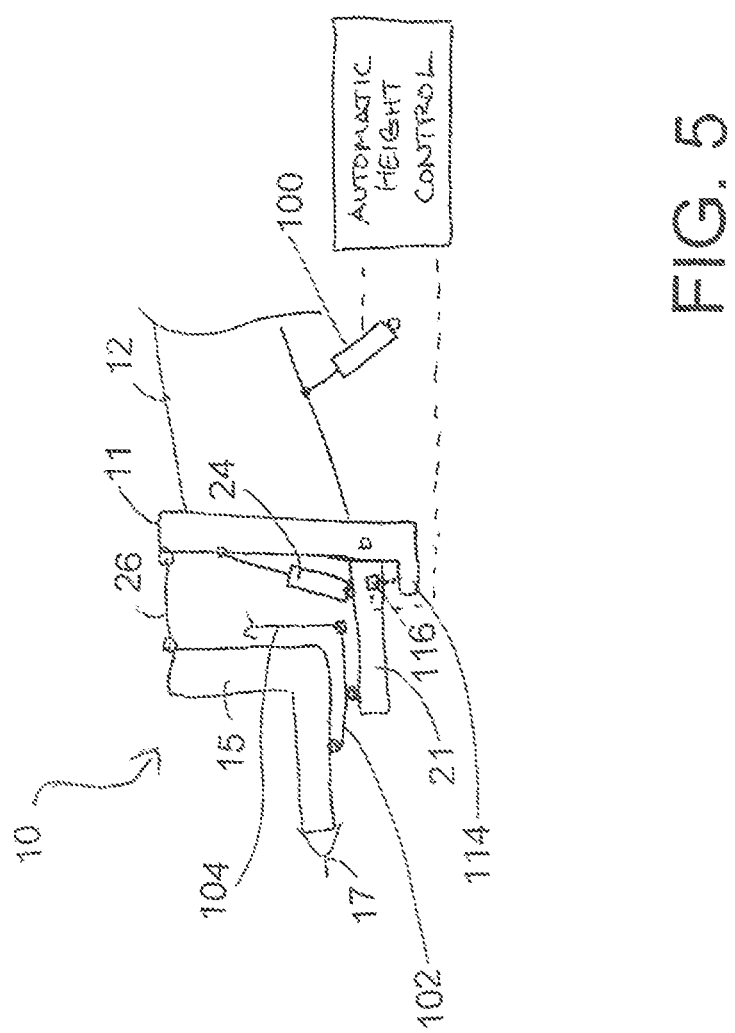
FIG. 5 is a schematic elevational view of the balancing linkage in relation to the suspension system supporting the header according to FIG. 1 on the feeder house of a combine harvester.

The frame structure is attached to a mounting assembly defined by the adapter 11 of FIG. 5 for carrying the main frame structure on the feeder house 12 of a propulsion vehicle such as a combine harvester by which the header is transported in movement in a forward direction generally at right angles to the width across ground including a crop to he harvested.

The crop cut by the sickle knife 47 of the cutter 45 fails onto the crop receiving table 44 carried on the main frame structure across the width of the header.

A skid element 48 on the main frame structure is located just behind the sickle knife of the cutter bar for engaging the ground so as to receive lifting forces from the ground. The skid element 48 is located behind the cutter bar and extends along the length of the cutter bar so that the cutter bar is supported adjacent the ground for cutting crop close to the ground as the skid element 48 slides over the ground.

A crop transport system 49 such as a draper system or auger is provided on the table for moving the cut crop toward a discharge location of the header. As described above, the harvesting header is operable in a first mode of operation shown in FIG. 7 with the skid element 48 engaging the ground and the cutter bar 45 adjacent the ground and in a second mode of operation shown in FIG. 8 with the skid element 48 and the cutter bar raised away from the ground.

As explained previously and shown in FIG. 4, the first wing frame portion 10B is connected to the center frame portion 10A by a first pivot coupling 102 which provides pivotal movement of the first wing frame portion 108B relative to the center frame portion 10A about a first pivot axis extending in a plane parallel to the forward direction. Symmetrically the second wing frame portion 10C is mounted on the other side if the center section.

The first pivot coupling 102 is provided to support weight from the first wing frame portion 10B while outboard weight from the first wing frame portion 10B outboard of the first pivot coupling rotates the first wing frame portion 10B about the first pivot coupling in a downward direction. Symmetrically the second wing frame portion 10C is mounted on the other side if the center section and supported by a symmetrical coupling.

As explained previously, the mounting assembly including a float suspension system 24 connected to the center frame portion providing a variable lifting force from the propulsion vehicle acting to support the main frame structure for floating movement relative to the propulsion vehicle. A first interconnecting float linkage 108 is connected between the center frame portion 10A and the first wing frame portion 10B which communicates a first variable lifting force from the center frame portion to the first wing frame portion against the outboard weight of the first wing frame portion. A second symmetrical interconnecting linkage communicates a second variable lifting force from the center frame portion to the second wing frame portion against the outboard weight of the second wing frame portion.

In the first mode of operation with the skid element 48 engaging the ground, the float suspension system 24 and first and second interconnecting linkages 108 provide a downforce from the skid element 48 on the ground which is balanced between the center frame portion 10A and the first and second wing frame portions 10B, 10C.

As set out hereinbefore, the above arrangements are conventional and further details can be obtained from the referenced patents or from machines well known in the industry and manufactured by MacDon.

In accordance with the arrangement described herein, there is provided a gauging system 50 used in the second mode of operation to hold the cutter bar in the raised position of FIG. 8.

This includes four separate ground engaging members 51 located in the positions shown in FIG. 1. This includes a first ground engaging member 51 supported on the first wing frame portion 10B at a location spaced outwardly from the center frame portion and particularly at the outer end of the portion at the crop divider and end sheet of the header for engaging the ground so as to receive lifting forces from the ground, a second ground engaging member 51 supported on the second wing frame portion 10C also at the outer end and two additional ground engaging member 51 supported on the wing frame portions immediately proximate the center frame portion 10A for engaging the ground so as to receive lifting forces from the ground. The two additional members 51 can be located on the center section. The outer members are preferably located at the ends but also can be moved inboard.

The location of the four ground engaging elements 51 at the locations specified provides a proper balance of the header relative to the nominal balance points P on the wing frame portions 10B and 10C. The points P represent the locations where the three sections will be balanced if supported by members at the points. It will be noted that the actual ground engaging members are located at spaced positions from these points. Thus the outermost member 51 is located at the outer end of the wing and the innermost member 51 is located closely adjacent the pivot coupling. These locations are spaced sufficiently from the points P so that ground forces transmitted to the frame through the members 51 will allow the wings to flex around the pivot points and keep all three sections at a common spacing from the ground.

In the embodiment of FIGS. 6 to 9, each of the ground engaging members 51 has a surface arrangement defined by the periphery 53 of a pair of wheels 54 carried on an axle 55. The surface 53 engages the ground at a position rearwardly of the cutter bar and underneath the table such that, in the second mode of operation, the ground engaging members collectively support the skid element 48 spaced above the ground while the first and second wing frame portions are allowed to pivot relative to the center frame portion in response to changes in ground height.

The wheels 54 defining each of the surface arrangements are mounted by the axle 55 on an elongate support member 56 connected at a forward end 57 adjacent to and rearwardly of the cutter bar 47 for pivotal movement about an axis 58 parallel to the cutter bar 47. The elongate support member 56 forms a rigid beam arranged to be raised and lowered to raise and lower the wheels 54 and the surface arrangement 53 defined thereby;

As shown in FIG. 8, each of the wheels is fully retractable, by raising of the elongate support member or beam 56 to an uppermost raised position within the channel 43, to a height of the wheel underneath the table to cause the skid element 48 or cutter bar polymer shield to engage and run across the ground in the first mode of operation cutting at ground level. In this mode the header will ride either on the cutter bar shield or on the skid shoe depending on the header angle.

Thus the first and second ground engaging members are mounted at respective outer ends of the first and second wing frame portions and the two inner additional ground engaging members 51 are mounted on the first wing frame portion closely adjacent to the pivot axis and on the second wing frame portion closely adjacent the pivot axis. In the second mode of operation and in this arrangement where the ground engaging members are mounted only on the wing sections, the center frame portion is supported only by said float suspension system and not by any additional ground engaging members 51.

Each of the elongate support beams 56 extends rearwardly under the table to a rear end 59 rearward of the table. At the rear end there is provided an upstanding telescopically extendible member 60 connected at a lower end 61 to the elongate support beam 56 and to a lug 63 of the frame structure at the upper end 62 rearward of the table to raise and lower the beam relative to the frame and thus the cutter bar relative to the around.

Figure 10:
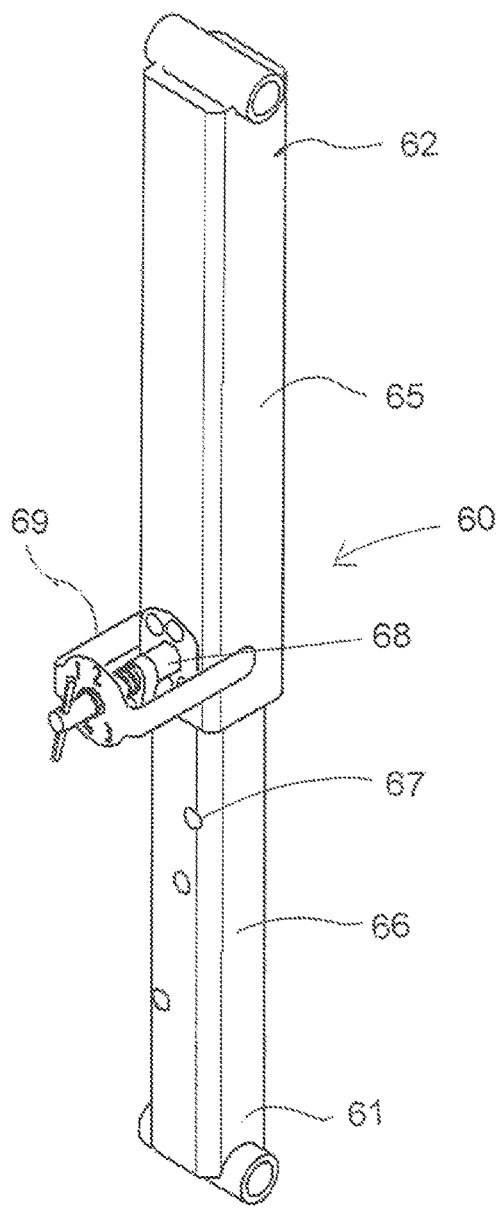
FIG. 10 is an enlarged view of the extendible post of the embodiment of FIGS. 6 to 8.
Figure 11:
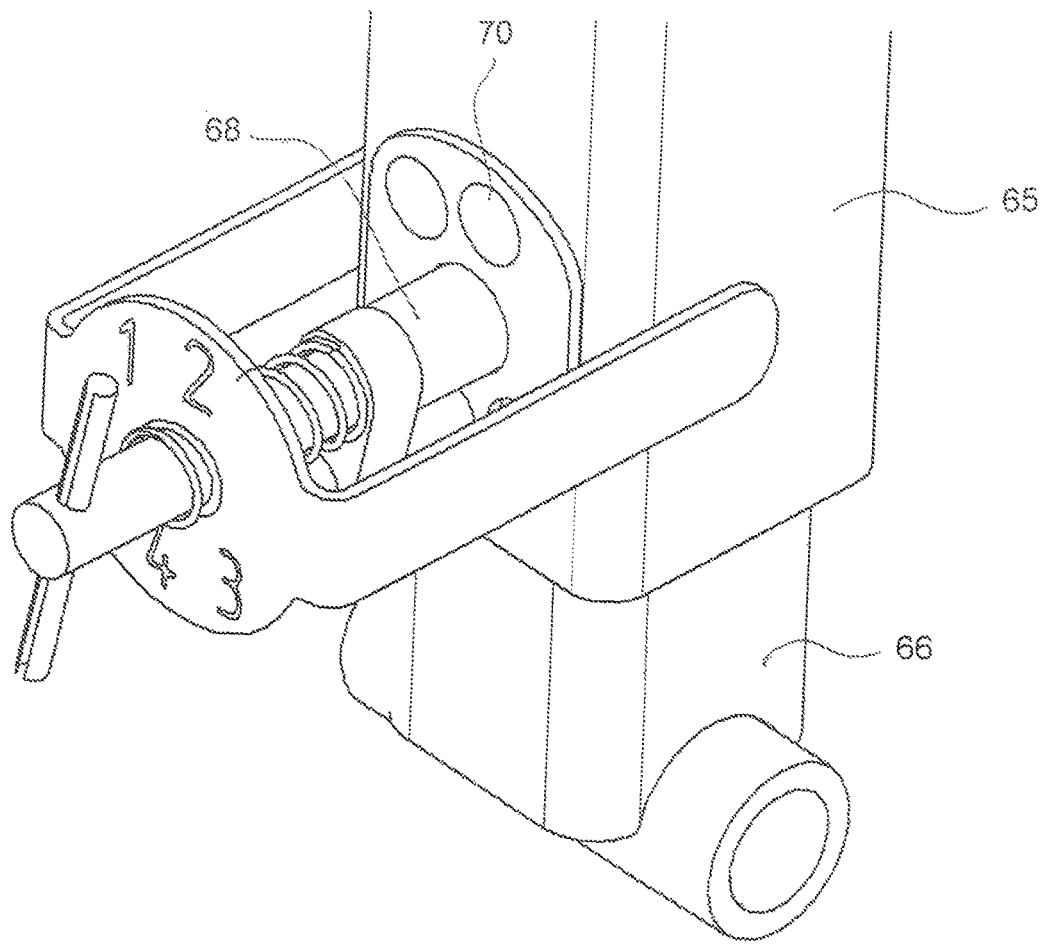
FIG. 11 is a further enlarged view of the extendible post of the embodiment of FIGS. 6 to 8.

As best shown in FIGS. 10 and 11 the extendible member comprises a pair of telescopic members 65 and 66 including an outer member 65 with an inner member 66 slidable within the outer member. The inner member 66 has a plurality of longitudinally spaced holes 67 for receiving a pin 68 of the outer member to locate the inner and outer members al an extension position defined by the selected hole. The holes 67 are spaced also transversely across the inner member and the pin is carried on a rotatable member 69 which acts when rotated to move the pin 68 transversely across the outer member into a selected one of a plurality of holes 70 so that the transverse position of the pin is adjusted as the member 69 is rotated and when rotated acts automatically to select one of the holes of the inner member, thus determining the telescopic length of the member 60. The elongate support members are each located in a second channel portion 46 of a respective one of said frame members 41 and extends rearwardly under the table to the rear member 60 for adjustment.

Each of the ground engaging surfaces 53 is located under the table so that it is forward of the rear of the table. Thus when raised, the amount of movement allowed is relatively small, in order to achieve the required height of the cutter bar of at least 12 inches and preferably greater than 14 inches, the mounting assembly includes the tilt cylinder 26 connected to the frame structure of the header for tiling the frame structure and the cutter bar carried thereby forwardly and rearwardly. Thus when actuated by a switch 72 the tilt cylinder can be retracted to pull the front of the header upwardly to further increase the height of the cutter bar, although the arrangement described herein provides a required height of the cutter bar even without the tiling action of the cylinder 26.

In a case where the manual adjustment of the member 60 is replaced by a hydraulic cylinder, common operation of the lowering of the elongate support members 60 and the tilt cylinder causes the cutter bar to be raised such that the cutter bar is located at a cutting height from the ground of greater than 12 inches.

Figure 6:
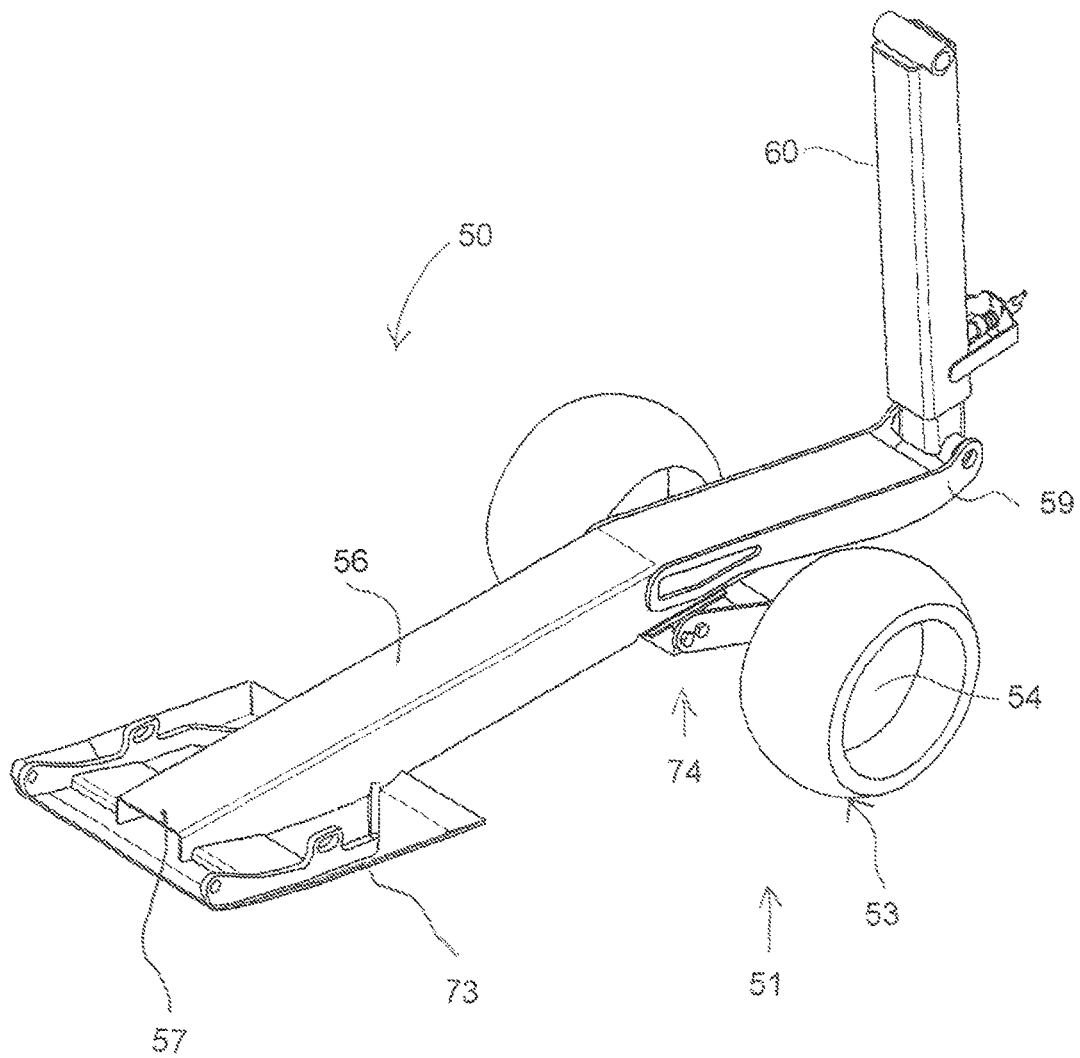
FIG. 6 is a isometric view of one gauge wheel assembly for use in the harvesting header of FIGS. 1 to 5 according to the invention.

As shown in FIGS. 6, 7 and 8, the forward end 57 of the member 56 can include a skid plate 73. The forward end is pivotally connected to a transverse mounting pin attached to the frame behind the skid element 48. Suitable lugs are attached to the frame member 41 at the forward end to receive the pin. As an alternative, the skid plate 73 can form a part of the header and is mounted to the frame permanently by a pin for pivotal movement about the pin. In this arrangement the forward end of the member 56 is attached by a coupling to the skid plate.

Figure 9:
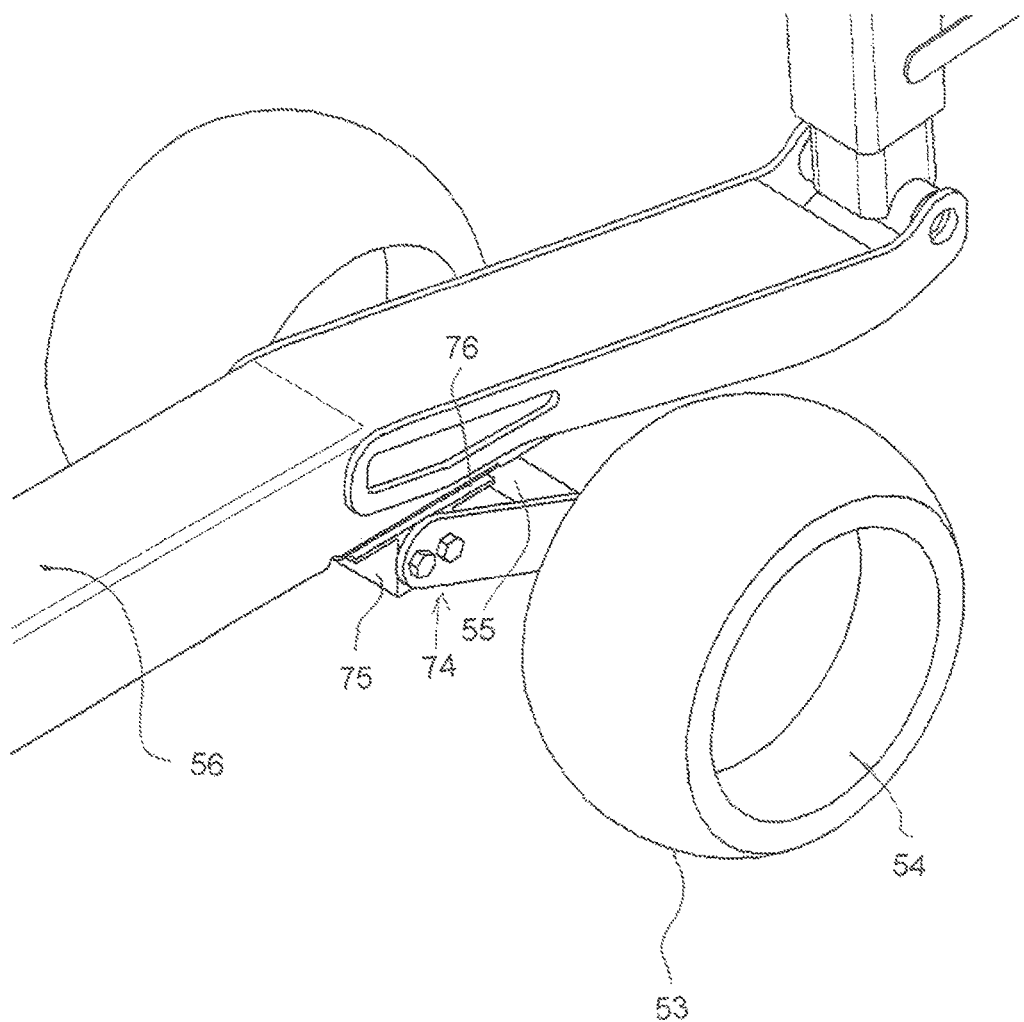
FIG. 9 is an enlarged view of the wheels and suspension of the embodiment of FIGS. 6 to 8.

As shown in FIGS. 6 and 9, the axle 55 of the wheels 54 is mounted on a suspension linkage 74 which allows the axle to move up and down on the linkage about a pivot pin 75 at the forward end with a resilient block or spring 76 resisting the upward movement of the wheels toward the member 56. This provides a resilient suspension arrangement between the elongate support member and the wheels allowing up and down floating movement of the wheels.

Figure 12:
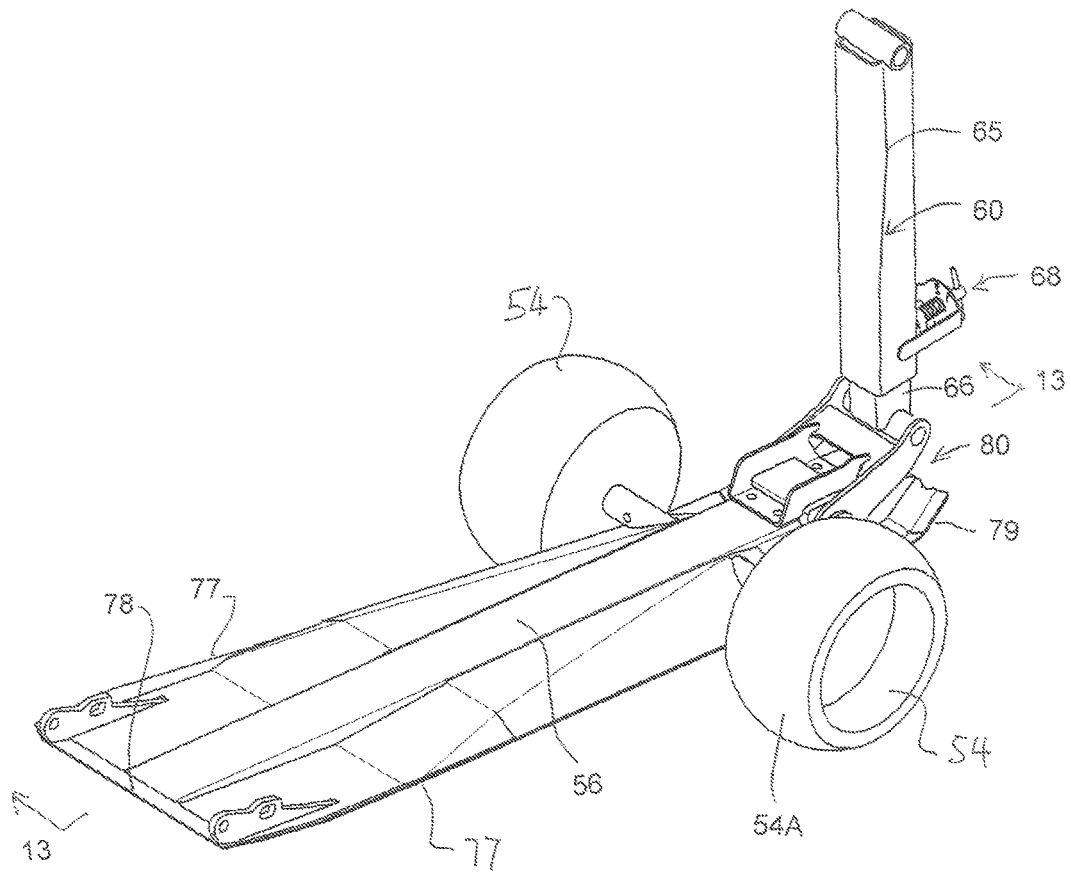
FIG. 12 is a isometric view of a second embodiment of one gauge wheel assembly for use in the harvesting header of FIGS. 1 to 5 according to the invention where the resilient suspension arrangement is located at the rear.
Figure 13:
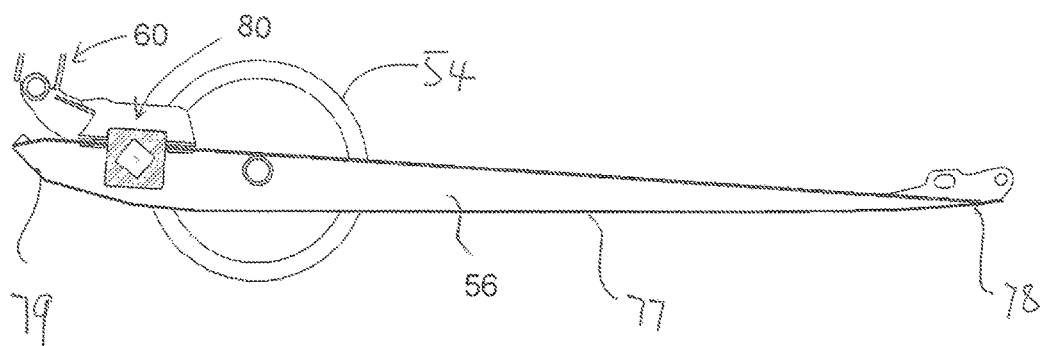
FIG. 13 is a cross-sectional view along the lines 13-13 of the embodiment of FIG. 12.
Figure 14:
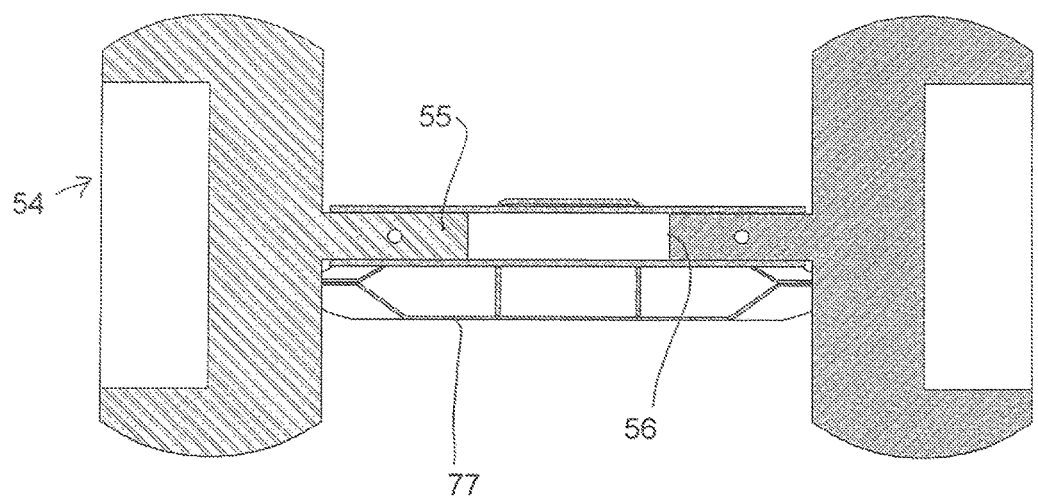
FIG. 14 is a cross-sectional view along the lines 14-14 of the embodiment of FIG. 12.

In FIGS. 12, 13 and 14 is shown an alternative arrangement where the surface arrangement for engaging the ground comprises a skid surface 77 which extends from a forward edge 78 effectively as a continuous slide surface rearwardly to a rear end 79 at the extendible member 60 just behind the rear edge of the table. The surface 77 thus forms a continuous surface which slides over the ground from a front edge at a position adjacent the cutter bar to a position at least adjacent to the rear edge of the table. As shown in the cross-sections of FIGS. 13 and 14, the skid surface 77 is arched both longitudinally and transversely.

The skid surface is carried on the member 56 as a permanent attachment thereto and can be used alone to run over the ground. Alternatively the skid member can be used in conjunction with a pair of ground wheels 54A mounted on the member 56 by a suspension arrangement similar to that previously described. Thus when the wheels are used they can float upwardly relative to the skid surface so that primarily the wheels run on the ground and provide the support. The wheels can be removed in some conditions such as heavy mud where they may be ineffective or may collect mud. That is the wheel arrangement is removable to allow the skid surface to slide on the ground.

As can be seen in FIGS. 6 and 12, the wheel assemblies pivot near the cutter bar and have a short skid 57 that is part of the structure that the header would only ride on when cutting directly on the ground. The device of FIG. 6 comprises a short skid shoe 57 on the leading edge near the cutting edge of the header with a member 56 extending rearward allowing the attachment of ground following wheels 54 and an adjustment device 60 at the rear of the header.

The location of the four wheel assemblies where are at each end of the header, and two are near the hinge points as displayed in FIG. 1 ensures enough moment about the virtual balance point of the header to overcome friction and cause the header to flex. This allows the operator to use the header while in flex mode in order to achieve better ground following while cutting as high as 18" off the ground.

The wheel assembly contains an isolator 74 to aid in eliminating header bounce and stress on components as the wheels travel over bumps and other incompressible objects. One embodiment of the isolator consists of a torsional rubber isolator which is mounted to the member 76 that spans from the cutter bar to the rear adjuster. In this case, the wheel assembly 54 and axle 55 which contains two links is bolted to the torsional isolator 76. As the wheel 54 strikes an object, the links convert the force into a moment which causes the isolator 74 to rotate and absorb the load.

The means of adjusting the height of the wheel assembly can be a manual adjuster such as is explained later or a hydraulic wheel height adjustment system. With the manual adjuster, the operator would set all four adjusters to a height which is close to the desired cut height and fine adjustments can then be made to the cut height by changing the tilt of the header using the cylinder 26. With the hydraulic adjustment which contains four hydraulic cylinders in a series circuit in a master slave arrangement, and a switch 72 in the combine cab, the operator can adjust the height of the wheels by actuating the cylinders using the in cab switch while harvesting.

The long skid shoe embodiment of FIGS. 12, 13 and 14 consists of a member positioned such that the header rides on the shoes when in cutting position. The operator may choose to retract the shoes such that the header can cut on the ground, effectively removing the long skid shoes from operation. This enables the operator to adjust cut height such that a desired stubble length can be achieved. The embodiment shown allows for a stubble height ranging from 1.25" up to 14".

The long shoe 77 may either be integrated into standard short skid shoes 57 near the front of the header, or exist in addition to short standard skid shoes 57.

The wheels 54A can be permanently attached to the skid shoe or removable as desired.

The wheels 54, 54A may consist of a variety of materials, including a solid material as shown in this embodiment, or a pneumatic wheel.

The wheels 54 may be fixed position along the member 56 or include an adjustable member (not shown) such that the distance of the wheel from the cutter bar may be altered.

The wheels 54A may be used to increase the stubble height beyond the range of the shoe. In this embodiment, 18 inches may be achieved using the wheels. The wheels 54A offer all of the benefits of the skid shoe, while increasing the life of the device in abrasive conditions, as well as reducing friction.

The preferred method of providing shock absorption is to install a resilient isolator 80 at the connection of the vertical post 60 and rear of the beam 56 carrying the skid shoe member 77. The isolator provides a hinge with a resilient rubber restrictor at the hinge which provides flexibility between the rear of the skid and the post 60 so that the skid can ride up and down to accommodate changes in terrain. Various arrangements for providing flexibility at this location are possible.

The invention claimed is:

1. A crop harvesting header comprising:
a main frame structure extending across a width of the header;
a connection assembly carrying the main frame structure on a propulsion vehicle in movement in a forward direction generally at right angles to the width across ground including a crop to be harvested;
a crop receiving table carried on the main frame structure across the width of the header;
a cutter bar across a front of the table which moves through the crop in a cutting action and carrying a sickle knife which cuts the crop as the header is moved forwardly;
a skid element engaging the ground adjacent the cutter bar;
the skid element extending along the length of the cutter bar so that the cutter bar is supported adjacent the ground as the skid element slides over the ground;
a crop transport system on the table;
the harvesting header having a first position of the header in which the skid element engages the ground and a second position of the header in which the skid element is raised away from the ground;
the main frame structure including a center frame portion, a first wing frame portion and a second wing frame portion;
the first wing frame portion being connected to the center frame portion by a first pivot coupling which provides pivotal movement of the first wing frame portion relative to the center frame portion about a first pivot axis extending in a plane parallel to the forward direction;
the first pivot coupling acting to support weight from the first wing frame portion while outboard weight from the first wing frame portion outboard of the first pivot coupling rotates the first wing frame portion about the first pivot coupling in a downward direction;
the second wing frame portion being connected to the center frame portion by a second pivot coupling which provides pivotal movement of the second wing frame portion relative to the center frame portion about a second pivot axis extending in a plane parallel to the forward direction;
the second pivot coupling acting to support weight from the second wing frame portion while outboard weight from the second wing frame portion outboard of the second pivot coupling rotates the second wing frame portion about the second pivot coupling in a downward direction;
the connection assembly including a float suspension system connected to the center frame portion providing a variable lifting force from the propulsion vehicle acting to support the main frame structure relative to the propulsion vehicle;
a first interconnecting float linkage connected between the center frame portion and the first wing frame portion which communicates a first variable lifting force from the center frame portion to the first wing frame portion against the outboard weight of the first wing frame portion;
a second interconnecting linkage connected between the center frame portion and the second wing frame portion which communicates a second variable lifting force from the center frame portion to the second wing frame portion against the outboard weight of the second wing frame portion;
in the first position of the header with the skid element engaging the ground, the float suspension system and first and second interconnecting linkages provide a downforce from the skid element on the ground which is balanced between the center frame portion and the first and second wing frame portions;
and a gauging system used in the second position of the header comprising:
a first ground engaging member supported on the first wing frame portion at a location spaced outwardly from the center frame portion engaging the ground so as to receive lifting forces from the ground;
a second ground engaging member supported on the second wing frame portion at a location spaced outwardly from the center frame portion engaging the ground so as to receive lifting forces from the ground; and
additional ground engaging members supported on the main frame structure proximate the center frame portion engaging the ground so as to receive lifting forces from the ground;
each of the ground engaging members having a surface arrangement engaging the ground at a position rearwardly of the cutter bar and forwardly of a rear of the table with the first, second and additional ground engaging members in the second position of the header collectively supporting the skid element spaced above the ground while the first and second wing frame portions pivot relative to the center frame portion in response to changes in ground height;
a mounting assembly of the surface arrangements comprising an elongate support member connected at a forward end rearwardly of the cutter bar and forward of the rear of the table by a pivot coupling providing pivotal movement about an axis parallel to the cutter, the elongate support member extending rearwardly from the pivot coupling at the forward end;
an adjustment device which raises and lowers each elongate support member to raise and lower the surface arrangement between said first and second positions of the header;
wherein, in the first position of the header, each of the surface arrangements is fully retracted by raising of the elongate support member to a height underneath the table in which the skid element engages the ground.

2. The crop harvesting header according to claim 1 wherein said first and second ground engaging members are mounted at respective outer ends of the first and second wing frame portions and said additional ground engaging members comprise a first additional ground engaging member mounted on the first wing frame portion closely adjacent to the pivot axis and a second additional ground engaging member mounted on the second wing frame portion closely adjacent the pivot axis, and wherein the center frame portion is supported only by said float suspension system and not by any one of said additional ground engaging members.

3. The crop harvesting header according to claim 1 wherein each of the elongate support members extends rearwardly under the table to a rear end rearward of the table and there is provided an upstanding extendible member connected at a lower end to the elongate support member and to the frame structure above the lower end and rearward of the table to raise and lower the cutter bar relative to the ground.

4. The crop harvesting header according to claim 3 wherein the extendible member comprises a pair of telescopic members with an outer with an inner member slidable within an outer member, wherein the inner member has a plurality of longitudinally spaced holes for receiving a pin of the outer member to locate the inner and outer members at an extension position defined by the selected hole, wherein the holes are spaced transversely of the inner member and the pin is carried on a rotatable member which acts when rotated to move the pin transversely across the outer member so that the transverse position of the pin when rotated acts automatically to select one of the holes of the inner member.

5. The crop harvesting header according to claim 1 wherein
the main frame structure includes a frame beam and a plurality of frame members located at spaced positions across the main frame structure;
each frame member extending from the frame beam in a first portion downwardly behind the table and in a second portion forwardly under the table to support the cutter bar;
the second portion forming a channel member with a downwardly facing open face;
the elongate support members each being located in a second portion of a respective one of said frame members and extending rearwardly under the table.

6. A crop harvesting header comprising:
a main frame structure extending across a width of the header;
a connection assembly carrying the main frame structure on a propulsion vehicle in movement in a forward direction generally at right angles to the width across ground including a crop to be harvested;
a crop receiving table carried on the main frame structure across the width of the header;
a cutter bar across a front of the table which moves through the crop in a cutting action and carrying a sickle knife which cuts the crop as the header is moved forwardly;
a skid element engaging the ground adjacent the cutter bar;
the skid element extending along the length of the cutter bar so that the cutter bar is supported adjacent the ground for cutting crop close to the ground as the skid element slides over the ground;
a crop transport system on the table;
the harvesting header having a first position of the header in which the skid element engages the ground and a second position of the header in which the skid element is raised away from the ground;
and a gauging system used in the second position comprising a plurality of ground engaging member each supported on the main frame structure fer engaging the ground so as to receive lifting forces from the ground;
each of the ground engaging members having a surface arrangement engaging the ground at a position rearwardly of the cutter bar and forwardly of a rear edge of the table with the ground engaging members in the second position of the header collectively supporting the skid element spaced above the ground;
a mounting assembly of the surface arrangements comprising an elongate support member connected at a forward end rearwardly of the cutter bar and forward of the rear of the table by a pivot coupling providing pivotal movement about an axis parallel to the cutter, the elongate support member extending rearwardly from the pivot coupling at the forward end;
an adjustment device which raises and lowers the elongate support member to raise and lower the surface arrangement between said first and second positions of the header;
wherein the connection assembly includes a tilt cylinder connected to the main frame structure of the header which tilts the main frame structure and the cutter bar carried thereby forwardly and rearwardly about an axis parallel to the cutter bar;
and wherein in the second position of the header with the surface arrangement lowered and the main frame structure tilted rearwardly the cutter bar is located at a cutting height from the ground of greater than 12 inches.

7. The crop harvesting header according to claim 6 wherein the cutting height is greater than 14 inches.

8. The crop harvesting header according to an claim 6 wherein:
the main frame structure includes a center frame portion, a first wing frame portion and a second wing frame portion;
the first wing frame portion is connected to the center frame portion by a first pivot coupling which provides pivotal movement of the first wing frame portion relative to the center frame portion about a first pivot axis extending in a plane parallel to the forward direction;
the first pivot coupling acts to support weight from the first wing frame portion while outboard weight from the first wing frame portion outboard of the first pivot coupling rotates the first wing frame portion about the first pivot coupling in a downward direction;
the second wing frame portion is connected to the center frame portion by a second pivot coupling which provides pivotal movement of the second wing frame portion relative to the center frame portion about a second pivot axis extending in a plane parallel to the forward direction;
the second pivot coupling acts to support weight from the second wing frame portion while outboard weight from the second wing frame portion outboard of the second pivot coupling rotates the second wing frame portion about the second pivot coupling in a downward direction;
the connection assembly includes a float suspension system connected to the center frame portion providing a variable lifting force from the propulsion vehicle acting to support the main frame structure relative to the propulsion vehicle;

a first interconnecting float linkage is connected between the center frame portion and the first wing frame portion which communicates a first variable lifting force from the center frame portion to the first wing frame portion against the outboard weight of the first wing frame portion;

a second interconnecting linkage is connected between the center frame portion and the second wing frame portion which communicates a second variable lifting force from the center frame portion to the second wing frame portion against the outboard weight of the second wing frame portion;

in the first mode of operation with the skid element engaging the ground, the float suspension system and first and second interconnecting linkages provide a downforce from the skid element on the ground which is balanced between the center frame portion and the first and second wing frame portions.

9. The crop harvesting header according to claim 8 wherein said first and second ground engaging members are mounted at respective outer ends of the first and second wing frame portions said additional ground engaging member comprises a first additional ground engaging member mounted on the first wing frame portion closely adjacent to the pivot axis and a second additional ground engaging member is mounted on the second wing frame portion closely adjacent the pivot axis, and wherein the center frame portion is supported only by said float suspension system and not by any one of said additional ground engaging members.

10. The crop harvesting header according to claim 6 wherein each of the elongate support members extends rearwardly under the table to a rear end rearward of the table and there is provided an upstanding extendible member connected at a lower end to the elongate support member and to the frame structure above the lower end and rearward of the table to raise and lower the cutter bar relative to the ground.

11. The crop harvesting header according to claim 10 wherein the extendible member comprises a pair of telescopic members with an outer with an inner member slidable within an outer member, wherein the inner member has a plurality of longitudinally spaced holes for receiving a pin of the outer member to locate the inner and outer members at an extension position defined by the selected hole, wherein the holes are spaced transversely of the inner member and the pin is carried on a rotatable member which acts when rotated to move the pin transversely across the outer member so that the transverse position of the pin when rotated acts automatically to select one of the holes of the inner member.

12. The crop harvesting header according to claim 6 wherein the main frame structure includes a frame beam and a plurality of frame members located at spaced positions across the main frame structure;

each frame member extending from the frame beam in a first portion downwardly behind the table and in a second portion forwardly under the table to support the cutter bar;

the second portion forming a channel member with a downwardly facing open face;

the elongate support members each being located in a second portion of a respective one of said frame members and extending rearwardly under the table.

13. A crop harvesting header comprising:

a main frame structure extending across a width of the header;

a connection assembly carrying the main frame structure on a propulsion vehicle in movement in a forward direction generally at right angles to the width across ground including a crop to be harvested;

a crop receiving table carried on the main frame structure across the width of the header;

a cutter bar across a front of the table which moves through the crop in a cutting action and carrying a sickle knife which cuts the crop as the header is moved forwardly;

a skid element engaging the ground adjacent the cutter bar;

the skid element extending along the length of the cutter bar so that the cutter bar is supported adjacent the ground for cutting crop close to the ground as the skid element slides over the ground;

a crop transport system on the table;

the harvesting header having a first position of the header in which the skid element engages the ground and a second position of the header in which the skid element is raised away from the ground;

and a gauging system used in the second position comprising a plurality of ground engaging member each supported on the main frame structure engaging the ground so as to receive lifting forces from the ground;

each of the ground engaging members having a surface arrangement engaging the ground at a position rearwardly of the cutter bar and forwardly of a rear edge of the table with the ground engaging members in the second position of the header collectively supporting the skid element spaced above the ground;

a mounting assembly of the surface arrangements comprising an elongate support member connected at a forward end rearwardly of the cutter bar and forward of the rear of the table by a pivot coupling providing pivotal movement about an axis parallel to the cutter, the elongate support member extending rearwardly from the pivot coupling at the forward end;

an adjustment device which raises and lowers the elongate support member to raise and lower the surface arrangement between said first and second positions of the header;

wherein, in the first position of the header, each of the surface arrangements is fully retracted by raising of the elongate support member to a height underneath the table in which the skid element engages the ground.

14. The crop harvesting header according to claim 13 wherein the connection assembly includes a tilt cylinder connected to the main frame structure of the header which tilts the main frame structure and the cutter bar carried thereby forwardly and rearwardly about an axis parallel to the cutter bar and wherein in the second position of the header with the surface arrangement raised and the main frame structure tilted rearwardly the cutter bar is located at a cutting height from the ground of greater than 12 inches.

15. The crop harvesting header according to claim 14 wherein the cutting height is greater than 14 inches.

16. The crop harvesting header according to claim 13 wherein each of the surface arrangements comprises a ground wheel.

17. The crop harvesting header according to claim 13 wherein the connection assembly including a float suspension system connected to the center frame portion providing a variable lifting force from the propulsion vehicle acting to support the main frame structure for floating movement relative to the propulsion vehicle.

\* \* \* \* \*